United States Patent
Lee

(10) Patent No.: US 9,522,796 B2
(45) Date of Patent: Dec. 20, 2016

(54) SCANNING DEVICE AND IMAGE FORMING APPARATUS TO CONVEY A DOCUMENT

(71) Applicant: Samsung Electronics Co., Ltd., Suwon-si, Gyeonggi-do (KR)

(72) Inventor: Jung-hoon Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/295,747

(22) Filed: Jun. 4, 2014

(65) Prior Publication Data
US 2015/0172491 A1    Jun. 18, 2015

(30) Foreign Application Priority Data
Dec. 18, 2013  (KR) .................. 10-2013-0158681

(51) Int. Cl.
| | |
|---|---|
| H04N 1/04 | (2006.01) |
| B65H 5/06 | (2006.01) |
| H04N 1/00 | (2006.01) |
| H04N 1/32 | (2006.01) |

(52) U.S. Cl.
CPC ............ B65H 5/06 (2013.01); H04N 1/00543 (2013.01); H04N 1/3263 (2013.01); *H04N 2201/0098* (2013.01)

(58) Field of Classification Search
CPC ...... H04N 1/3263; H04N 1/00543; B65H 5/06
USPC .... 358/496, 498, 296, 401, 501; 399/21, 18, 399/367, 374
See application file for complete search history.

(56) References Cited

U.S. PATENT DOCUMENTS

| | | | |
|---|---|---|---|
| 6,549,739 B2 | 4/2003 | Dettinger et al. | |
| 8,128,087 B2 | 3/2012 | Choi | |
| 8,860,967 B2 | 10/2014 | Jo | |
| 2006/0291929 A1* | 12/2006 | Ono et al. | 399/367 |
| 2008/0012200 A1 | 1/2008 | Lin et al. | |
| 2008/0191412 A1 | 8/2008 | Tu | |
| 2008/0225354 A1 | 9/2008 | Kim | |
| 2011/0013960 A1 | 1/2011 | Ito | |
| 2012/0228822 A1 | 9/2012 | Akiyama et al. | |
| 2013/0088761 A1 | 4/2013 | Kim | |

FOREIGN PATENT DOCUMENTS

| | | |
|---|---|---|
| JP | 3-115036 | 5/1991 |
| JP | 10026853 A * | 1/1998 |

(Continued)

OTHER PUBLICATIONS

International Search Report mailed Oct. 1, 2014 in related International Application No. PCT/KR2014/005673.
(Continued)

*Primary Examiner* — Cheukfan Lee
(74) *Attorney, Agent, or Firm* — Staas & Halsey LLP

(57) ABSTRACT

A scanning device and an image forming apparatus are provided. The scanning device includes document feeding rollers to convey a document along a document feeding path, a scanning member provided on the document feeding path to read images from the document, a cover to open and close a part of the document feeding path, a knob to manually rotate the document feeding rollers, and a clutch unit to selectively connect at least one of the document feeding rollers to the knob in correspondence with opening and closing operations of the cover.

17 Claims, 9 Drawing Sheets

(56) References Cited

FOREIGN PATENT DOCUMENTS

| | | | |
|---|---|---|---|
| JP | 10-91053 | | 4/1998 |
| JP | 11024434 A | * | 1/1999 |
| JP | 2003072978 A | * | 3/2003 |
| JP | 2011-203528 | | 10/2011 |
| JP | 2012-35942 | | 2/2012 |
| KR | 10-1992-0014114 | | 8/1992 |
| KR | 0115047 | | 12/1997 |
| KR | 10-2007-0072637 | | 7/2007 |
| KR | 10-2009-0010787 | | 1/2009 |
| KR | 10-2013-0008859 | | 1/2013 |

OTHER PUBLICATIONS

European Search Report mailed Aug. 27, 2015 in related European Application No. 14177985.0.

\* cited by examiner

SCANNING DEVICE AND IMAGE FORMING APPARATUS TO CONVEY A DOCUMENT

CROSS-REFERENCE TO RELATED APPLICATIONS

This application is related to, and claims the priority benefit of, Korean Patent Application No. 10-2013-0158681, filed on Dec. 18, 2013, in the Korean Intellectual Property Office, the disclosure of which is incorporated herein in its entirety by reference.

BACKGROUND

1. Field

One or more embodiments relate to a scanning device reading images from a document and an image forming apparatus including a scanning device.

2. Description of the Related Art

A scanning device is an apparatus to irradiate light onto a document and receiving light reflected from the document to read images recorded on the document. The scanning device may be classified as a flatbed type, in which a document may be located at a fixed position and a scanning member such as a contact type image sensor (CIS) or a charge coupled device (CCD) reads images while moving, a document feed type, in which a scanning member may be fixed at a location and a document is moved to be read, and a combined type thereof.

The scanning device may be used as a single device, or as a multi-functional device combined with a printer including a printing unit to print images on printing media or a copying machine.

In a case where a defect such as a paper jam or a double feed, that is, two or more documents conveyed simultaneously, occurs during a reading operation, one or more of the documents may need to be removed from a feeding path.

SUMMARY

One or more embodiments include a scanning device capable of removing a document when a defect in conveying documents occurs, and an image forming apparatus adopting the scanning device.

Additional aspects will be set forth in part in the description which follows and, in part, will be apparent from the description, or may be learned by practice of the presented embodiments.

According to one or more embodiments, a scanning device includes document feeding rollers to convey a document along a document feeding path, a scanning member provided on the document feeding path to read images from the document, a cover to open and close a part of the document feeding path, a knob to manually rotate the document feeding rollers, and a clutch unit to selectively connect at least one of the document feeding rollers to the knob in correspondence with opening and closing operations of the cover.

The clutch unit may disconnect the document feeding rollers and the knob from each other when the cover is located at a closed position, and may connect at least one of the document feeding rollers to the knob when the cover is located at an open position.

The document feeding path may include a scanning path in which the scanning member is provided, a supply path to supply a document to the scanning path, and a discharge path to discharge the document that has passed through the scanning path, and the cover opens and closes the supply path.

The document feeding path may include a scanning path in which the scanning member is provided, a supply path to supply a document to the scanning path, and a discharge path to discharge the document passed through the scanning path, and the cover opens and closes a part of the scanning path.

The clutch unit may include a first clutch member provided on one of the document feeding rollers, and including a first connection portion; a second clutch member rotating with the knob, and including a second connection portion that is formed complementary with the first connection portion, and a sliding member to slide the second clutch member between a connecting position where the first and second connection portions are connected to each other and a separation position where the first and second connection portions are separated from each other, by the opening and closing operations of the cover.

An extension axis that is coaxial with a rotary shaft of the document feeding roller having the first clutch member may be provided on the knob, and the second clutch member may be provided on the extension axis to be slid.

The clutch unit may include a first elastic member to apply an elastic force to the second clutch member in a direction toward the connecting position, and the sliding member may push the second clutch member in a direction opposite to the elastic force of the first elastic member to move the second clutch member to the separation position when the cover is moved from the opened position to the closed position.

The clutch unit may include a second elastic member applying an elastic force to the sliding member so that the sliding member slides in a direction of moving the second clutch member to the connection position.

The scanning device may include a feeding roller provided in the scanning path to convey the document, and the clutch unit may selectively connect the knob to the feeding roller.

The scanning device may include a discharge roller disposed on the discharge path discharge the document, and the discharge roller may be connected to the feeding roller and is rotated with the feeding roller when the knob is rotated.

According to one or more embodiments, an image forming apparatus includes: the scanning device described above; and a printing unit to form an image on a recording medium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
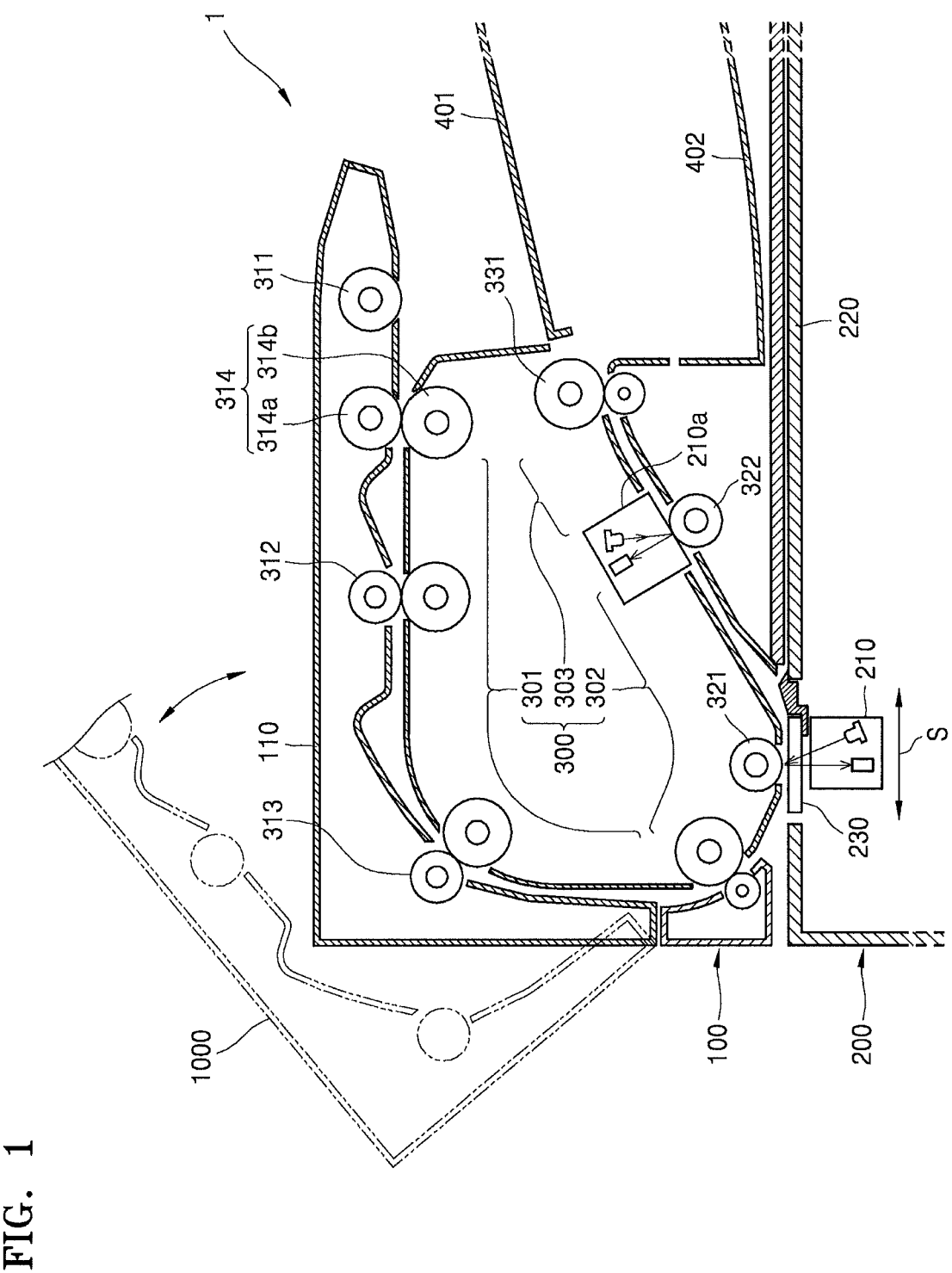
FIG. 1 is a schematic cross-sectional view of a scanning device according to an embodiment.

Reference will now be made in detail to embodiments, examples of which are illustrated in the accompanying drawings, wherein like reference numerals refer to the like elements throughout. In this regard, the embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Figure 2:
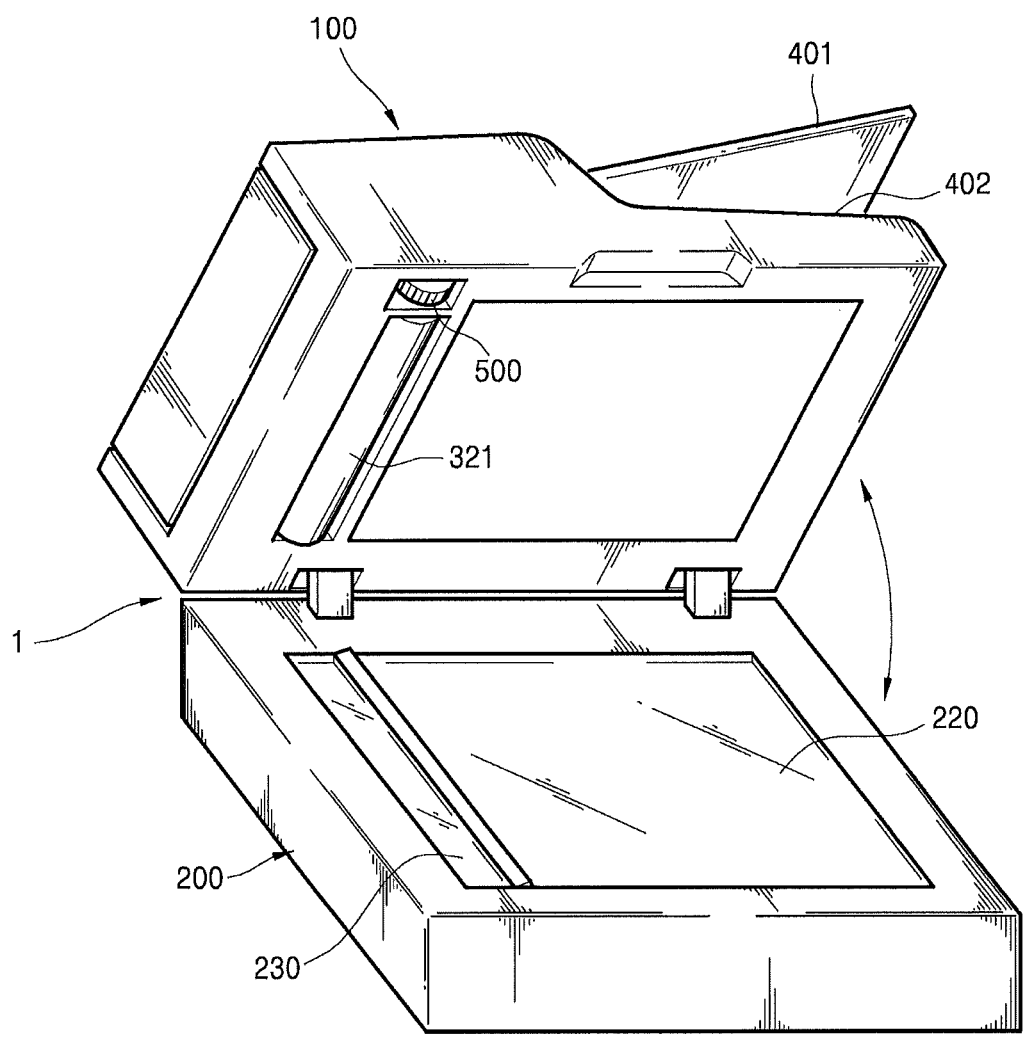
FIG. 2 is a schematic perspective view of an exemplary scanning device, illustrating a state where a document feed unit is opened.

FIG. 1 is a schematic cross-sectional view of a scanning device 1 according to an embodiment, and FIG. 2 is a schematic perspective view of the scanning device 1, and illustrating a status where a document feeding unit 100 is opened. Referring to FIGS. 1 and 2, the scanning device 1 includes the document feeding unit 100 and a scanning unit 200.

The scanning unit 200 includes a scanning member 210 to read images from a document. The scanning member 210 irradiates light to a document, and receives light reflected from the document to read images of the document. A contact type image sensor (CIS) or a charge coupled sensor (CCD), for example, may be used as the scanning member 210.

The scanning device 1 may be a scanning device of a combined type, that is, obtaining by combining a flatbed type and a document feed type. The scanning unit 200 may include a platen glass 220 on which a document is placed to read images from the document in a flatbed type. The scanning unit 200 includes a scanning window 230 to read images from the document in the document feed type. The scanning window 230 may be, for example, a transparent member. As an example, an upper surface of the scanning window 230 may be located at the same level as that of an upper surface of the platen glass 220.

In the document feed type, the scanning member 210 may be disposed under the scanning window 230. In a case of the flatbed type, the scanning member 210 may be transferred in a sub-scanning direction S, that is, a lengthwise direction of the document, by a transfer unit (not illustrated) under the platen glass 220. When the flatbed type is applied, the platen glass 220 may need to be exposed to the outside in order to place a document on the platen glass 220. As illustrated in FIG. 2, the document feeding unit 100 may be rotated with respect to the scanning unit 200. The document feeding unit 100 may be rotated between a first location where the document feeding unit 100 covers the scanning unit 200, and a second location where the scanning unit 200 is opened. When the document feeding unit 100 is located at the second location, the platen glass 220 is exposed to outside.

The document feeding unit 100 moves the document so that the scanning member 210 may read an image recorded on the document, and discharges the document that has read. The document feeding unit 100 includes a document feeding path 300, and the scanning member 210 reads the image from the document that is fed. The document feeding path 300 may include a supply path 301, a scanning path 302, and a discharge path 303. The scanning member 210 may be disposed on the scanning path 302, and the image recorded on the document may be read by the scanning member 210 while the document passes through the scanning path 302. The supply path 301 is a path to supply the document to the scanning path 302, and the document loaded in a supply tray 401 may be supplied to the scanning path 302 via the supply path 301. The discharge path 303 is a path discharge the document that has passed through the scanning path 302. The document loaded in the supply tray 401 may be transferred along the supply path 301, the scanning path 302, and the discharge path 303, and discharged to a discharge tray 402.

In order to make a duplex reading possible with a single document feeding operation, an additional scanning member 210a may be provided in the document feeding unit 100. The scanning unit 210 provided in the scanning unit 200 reads an image on a front surface of the document, and the scanning member 210a provided in the document feeding unit 100 reads an image on a rear surface of the document. The scanning member 210a may be located downstream of the scanning member 210 in a document feeding direction.

A plurality of document feeding rollers to feed documents may be provided on the document feeding path 300. For example, a pickup roller 311 pick up a document from the document feed tray 401, and supply rollers 312 and 313 transfer the picked document. Each of the supply rollers 312 and 313 may include a pair of rollers rotating while being engaged with each other to transfer the document. One of the pair of rollers may be a driving roller and the other may be a driven roller that is rotated by being compressed by the driving roller. When the supply path 301 is opened in order to remove a paper jam, the driven roller may be separated from the driving roller or a compression between the driven roller and the driving roller may be released. An automatic document feed (ADF) unit 314 to separate a selected document, e.g., one by one may be disposed between the pickup roller 311 and the supply roller 312. The ADF unit 314 may include a first ADF roller 314a and a second ADF roller 314b that are engaged with each other to rotate in opposite directions to each other. The first ADF roller 314a rotates in a direction in which the document is transferred to the supply path 301, and the second ADF roller 314b rotates in opposite direction thereto. If two or more documents are supplied between the first and second ADF rollers 314a and 314b, the first and second ADF rollers 314a and 314b may separate only one document and supply the document to the supply roller 312. For example, if a plurality of documents are introduced between the first and second ADF rollers 314a and 314b, a frictional force between the plurality of documents may be less than that between the first ADF roller 314a and the document and between the second ADF roller 314b and the document. Therefore, the document contacting the first ADF roller 314a and the document beneath the above document slide along each other. The document contacting the first ADF roller 314a may be separated and transferred toward the supply roller 312. The configuration of the ADF unit 314 is not limited to the example illustrated in FIG. 1, and the ADF unit 314 may have various structures.

Feeding rollers 321 and 322 to transfer the document may be disposed on the scanning path 302 to face the scanning members 210 and 210a. For example, the feeding roller 321 rotates while being elastically pressed against the scanning window 230 disposed in the scanning unit 200, and transfers the document supplied between the feeding roller 321 and the scanning window 230. The feeding roller 322 may be rotated while facing the scanning member 210a, and transfers the document supplied between the feeding roller 322 and the scanning member 210a. The scanning member 210a may be elastically compressed toward the feeding roller 322.

A discharge roller 331 discharge the document, from which the reading operation is finished, may be disposed on the discharge path 303. The discharge roller 331 may include a driving roller and a driven roller that are rotated while being engaged with each other.

Although not illustrated in the drawings, one or more sensors to sense documents may be disposed on the supply path 301, the scanning path 302, and the discharge path 303.

Since there are various reasons for generating a double-feed of the documents or a paper jam in the scanning device 1, it may be difficult to completely prevent generation of the defective feed of documents. Therefore, a configuration to easily removing the documents in a case where the double-feed of the document or the paper jam occurs is necessary. Since a document may be stuck between the rollers, the document may be pulled in the document transfer direction or a direction opposite to the direction of transferring the document, and with a lot of force, and thus, the document may be torn.

According to an exemplary scanning device 1, a configuration so a user of the scanning device 1 may rotate all, or some of, the document feeding rollers manually may be provided. For example, referring to FIG. 2, a mechanism, e.g., knob 500 may be exposed through a bottom surface of the document feeding unit 100. The knob 500 may be exposed to the outside, for example, when the document feeding unit 100 is rotated with respect to the read unit 200 and located at the second location. The knob 500 may be connected to the document feed rollers, for example, the supply rollers 311 and 312, the feeding rollers 321 and 322, and the discharge roller 331. Since all or some of the supply rollers 311 and 312, the feeding rollers 321 and 322, and the discharge roller 331 may be connected with each other by a power connection unit such as a gear or a belt, the user may rotate the document feeding rollers by rotating the knob 500 and remove the document on the document feeding path 300.

If the knob 500 is always connected to the document feeding rollers, the knob 500 may be also rotated while performing a reading operation. A large amount of load may be applied to a driving motor (not illustrated), and driving noise may generate and components may be worn out. Considering this, an exemplary scanning device 1 includes a clutch unit that may selectively connect the knob 500 to the document feeding rollers.

The knob 500 may be connected to one of the supply rollers 311 and 312, the feeding rollers 321 and 322, and the discharge roller 331. The scanning device 1 of an exemplary embodiment includes a cover 110 opening/closing a part of the document feeding path 300. For example, the cover 110 may be located between a closed position where the supply path 301 is formed, and an opening position where the supply path 301 is opened. When the cover 110 is located at the opening position, the supply path 301 may be partially or entirely opened. The cover 110 may be rotated as illustrated by broken lines 1000 of FIG. 1 to open the supply path 301. Thus, if the double-feed of the document or the paper jam occurs, the supply path 301 may be opened by rotating the cover 110 to remove the jammed document. When the supply path 301 is opened by rotating the cover 110, the first ADF roller 314a and the driven rollers of the supply rollers 312 and 313 may be rotated with the cover 110. Thus, the document in the supply path 301 may be easily removed. Since the scanning path 302 and the discharge path 303 are not opened by the rotation of the cover 110, the feeding rollers 321 and 322 and the discharge roller 331 need to be rotated to remove the document when the jammed document exists on the scanning path 302 and the discharge path 303. To do this, for example, the knob 500 may be connected to one of the feeding rollers 321 and 322 and the discharge roller 331. According to an exemplary embodiment, the knob 500 and the feeding roller 321 may be connected to each other via the clutch unit. The clutch unit selectively connects the knob 500 and the feeding roller 321 to each other in correspondence with the opening/closing of the cover 110. When the cover 110 is located at the closed position, the knob 500 may be disconnected from the feeding roller 321, and when the cover 110 is located at the opening position, the knob 500 may be connected to the feeding roller 321.

Figure 3:
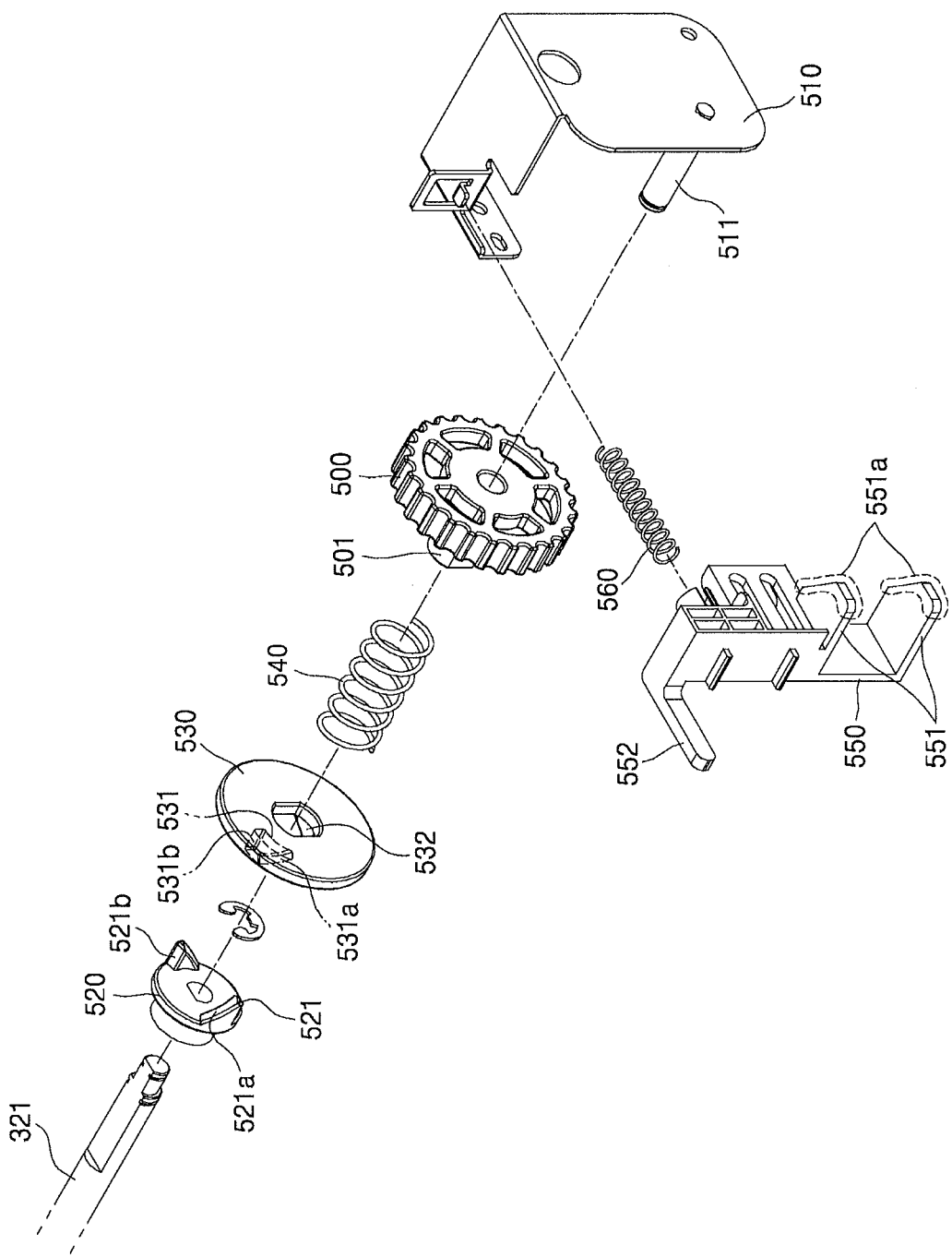
FIG. 3 is an exploded perspective view of a clutch unit according to an embodiment.

FIG. 3 is an exploded perspective view of the clutch unit according to an embodiment. Referring to FIG. 3, a first clutch member 520 and a second clutch member 530 are illustrated. The first clutch member 520 may be coupled to a rotary shaft of the feeding roller 321. The second clutch member 530 may be connected to the knob 500 to be rotated with the knob 500, and may be provided to be connected to/separated from the first clutch member 520. For example, a support axis 511 that is coaxial with the rotary shaft of the feeding roller 321 may be provided in a bracket 510, and the knob 500 is rotatably coupled to the support axis 511. The knob 500 includes an extension axis 501 extending to be coaxial with the support axis 511, and the second clutch member 530 may be provided in the extension axis 501 to be slid in the extension axis 501 direction. The second clutch member 530 includes an insertion hole 532 that configures a pair with the extension axis 501. The extension axis 501 and the insertion hole 532 may be formed so that the knob 500 and the second clutch member 530 may be rotated with each other. That is, when rotating the knob 500, the second clutch member 530 is also rotated.

The first and second clutch members 520 and 530 may respectively include first and second connection portions 521 and 531 that are complimentary members engaged with each other to transfer a rotating force. A first elastic member 540 applies an elastic force to the second clutch member 530 so that the first and second connection portions 521 and 531 may be slid in a direction of engaging with each other. The first elastic member 540 may be, for example, a compression coil spring having an end portion and the other end portion respectively supported by the knob 500 and the second clutch member 530.

A sliding member 550 may be slid in correspondence with the opening/closing operations of the cover 110. Although not illustrated in the drawings, the sliding member 550 may be provided on a frame of the document feeding unit 100 to be slidable. The sliding member 550 may be provided on the bracket 510 to be slidable. The sliding member 550 moves the second clutch member 530 to a connection position where the first and second connection portions 521 and 531 are engaged and a separation position where the first and second connection portions 521 and 531 are separated from each other, in correspondence with the opening/closing operations of the cover 110. The sliding member 550 includes a connection lever 552 that contacts the cover 110 and a push lever 551 pushing the second clutch member 530 to the separation position. The push lever 551 includes a contact portion 551a that slidably contacts the second clutch member 530 in order to move the second clutch member 530. The contact portion 551a may include an inclined surface that is inclined with respect to a sliding direction of the sliding member 550. The inclined surface may be a plane or a curved surface. A second elastic member 560 applies an elastic force to the sliding member 550 to be slid in a direction of moving the second clutch member 530 to the connection position. The second elastic member 560 may be, for example, a compression coil spring having an end portion and the other end portion respectively supported by the bracket 510 and the sliding member 550.

Figure 4A:
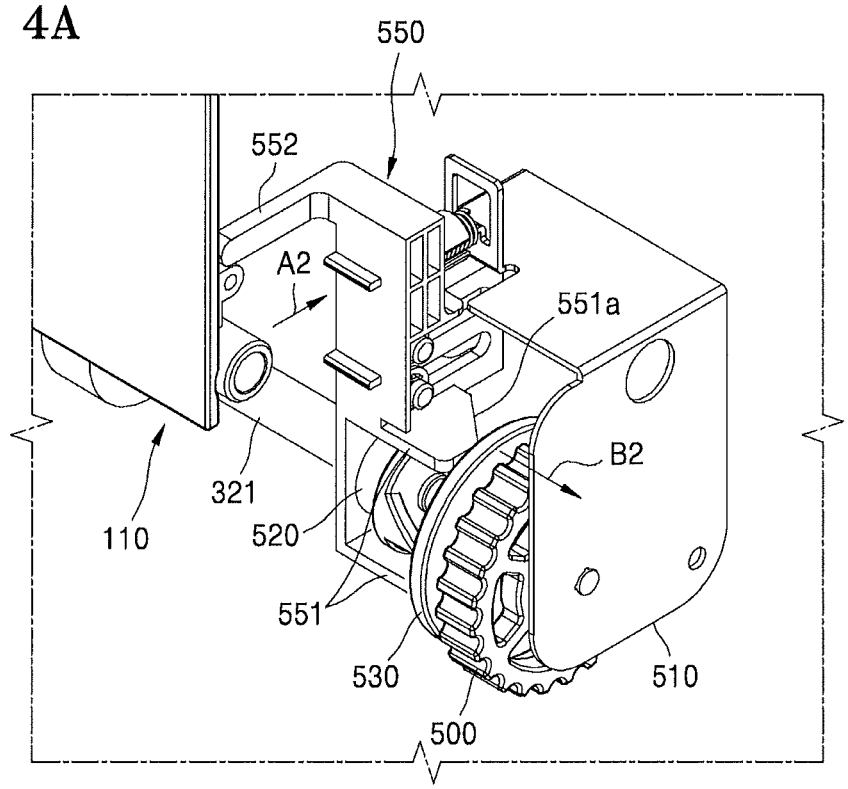
FIG. 4A is a perspective view of a clutch unit in a case where a cover is closed.
Figure 4B:
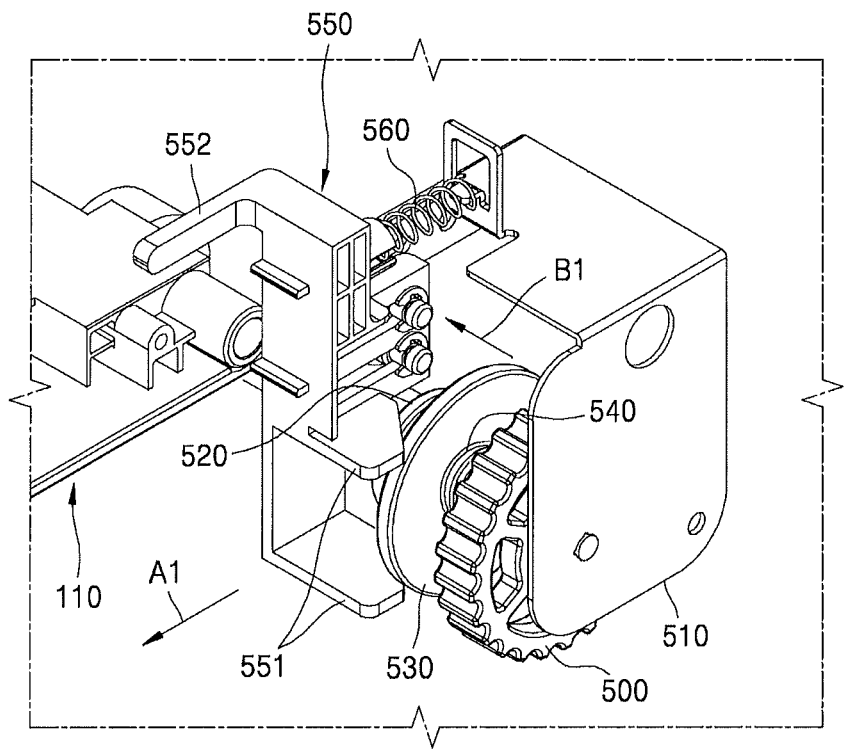
FIG. 4B is a perspective view of a clutch unit in a case where a cover is opened.

FIG. 4A is a perspective view of a clutch unit when the cover 110 is closed, and FIG. 4B is a perspective view of a clutch unit when the cover 110 is opened. Referring to FIG. 4A, since the cover 110 contacts the connection lever 552 of the sliding member 550 in a state where the cover 110 is closed, the sliding member 550 is not slid toward the cover 110, that is, in a direction A1, even with the elastic force of the second elastic member 560. The second clutch member 530 is located at the separation position by the push lever 551. In this state, even when the feeding roller 321 is rotated by a driving motor (not illustrated), the second clutch member 530 and the knob 500 are not rotated.

When the cover 110 is rotated to the opening location as denoted by the broken line 1000 of FIG. 1 in order to open a part of the document feeding path 300, for example, the supply path 301, as illustrated in FIG. 4B, the sliding member 550 may be slid in the direction A1 by the elastic force of the second elastic member 560 as the cover 110 is rotated. The push lever 551 may be separated from the second clutch member 530, and the second clutch member 530 may be slid in a direction B1 toward the first clutch member 520 by the elastic force of the first elastic member 540 so that the first and second connection portions 521 and 531 are located at the connection position where they are engaged with each other. In this state, as illustrated in FIG. 2, when the document feeding unit 100 is opened and the knob 500 exposed on the bottom surface of the document feeding unit 100 is rotated, the feeding roller 321 and the other rollers connected to the feeding roller, for example, the feeding roller 322 and the discharge roller 331, are rotated together, and the document existing in the scanning path 302 or the discharge path 303 may be discharged to the discharge tray 402. The driving rollers of the supply rollers 312 and 313 and the second ADF roller 314b may be rotated together.

After discharging the document, when the cover 110 is closed, the cover 110 pushes the connection lever 551. The sliding member 550 is pushed by the cover 110 and is slid in an opposite direction to a direction of the elastic force of the second elastic member 560, that is, a direction A2 of FIG. 4A, the push lever 551 pushes the second clutch member 530 in the opposite direction to the direction of the elastic force of the first elastic member 540, that is, the direction A2 of FIG. 4A, so that the first and second connection portions 521 and 531 are separated from each other. When the cover 110 is completely closed, as illustrated in FIG. 4A, the knob 500 and the feeding roller 321 are disconnected from each other.

The first and second connection portions 521 and 531 may be configured to be engaged with each other in a direction only. For example, driving powers of the first and second connection portions 521 and 531 may be connected to each other only in a direction of discharging the document to the discharge tray 402, and may not be connected in an opposite direction. To do this, referring to FIG. 3, the first connection portion 521 extends in a rotating direction and protrudes in an axial direction. An end portion 521a of the first connection portion 521 is formed as an inclined surface that is slowly inclined in the rotating direction, and the other end portion 521b is formed as a rapidly inclined surface. The second connection portion 531 extends in the rotating direction and protrudes in the axial direction. An end portion 531a of the second connection portion 531 corresponds to the end portion 521a of the first connection portion 521, and is formed as an inclined surface that is softly inclined in the rotating direction. The other end portion 531b of the second connection portion 531 corresponds to the other end portion 521b of the first connection portion 521, and is formed as a rapidly inclined surface. When the knob 500 is rotated in a direction of discharging the document, the other end portion 521b of the first connection portion 521 and the other end portion 531b of the second connection portion 531 contact each other. Therefore, when the second clutch member 530 is rotated, the first clutch member 520 and the feeding roller 321 connected to the first clutch member 5210 are rotated so that the document is discharged to the discharge tray 402. When the knob 500 is rotated in a direction opposite to the discharging direction of the document, the end portion 521a of the first connection portion 521 and the end portion 531a of the second connection portion 531 contact each other, and the second clutch member 530 is pushed in a direction opposite to the direction in which the elastic force of the first clutch member 540 is applied. Therefore, the rotating force of the second clutch member 530 is not transmitted to the first clutch member 520, and the feeding roller 321 does not rotate.

Figure 5:
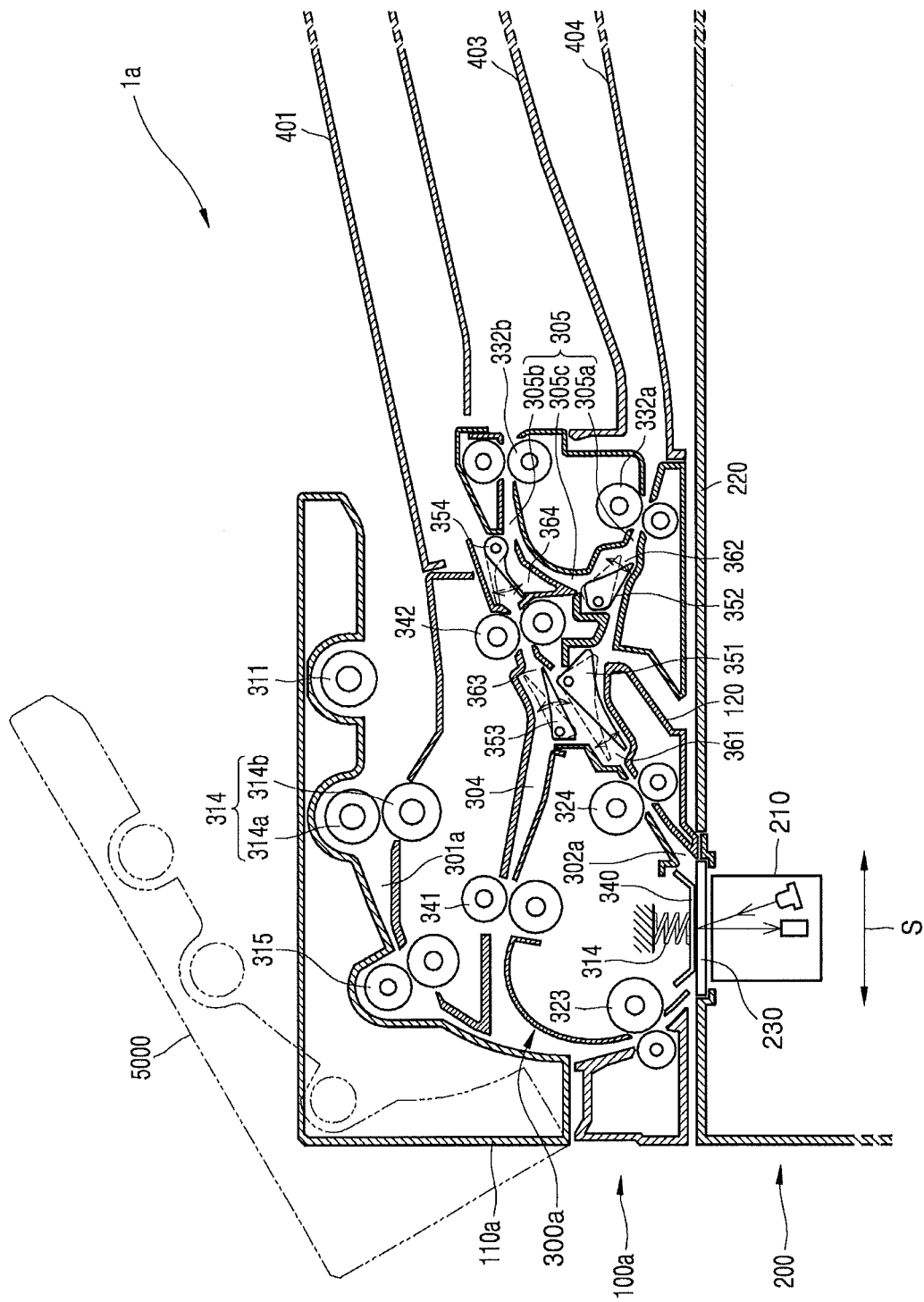
FIG. 5 is a schematic cross-sectional view of a scanning device according to an embodiment.
Figure 6:
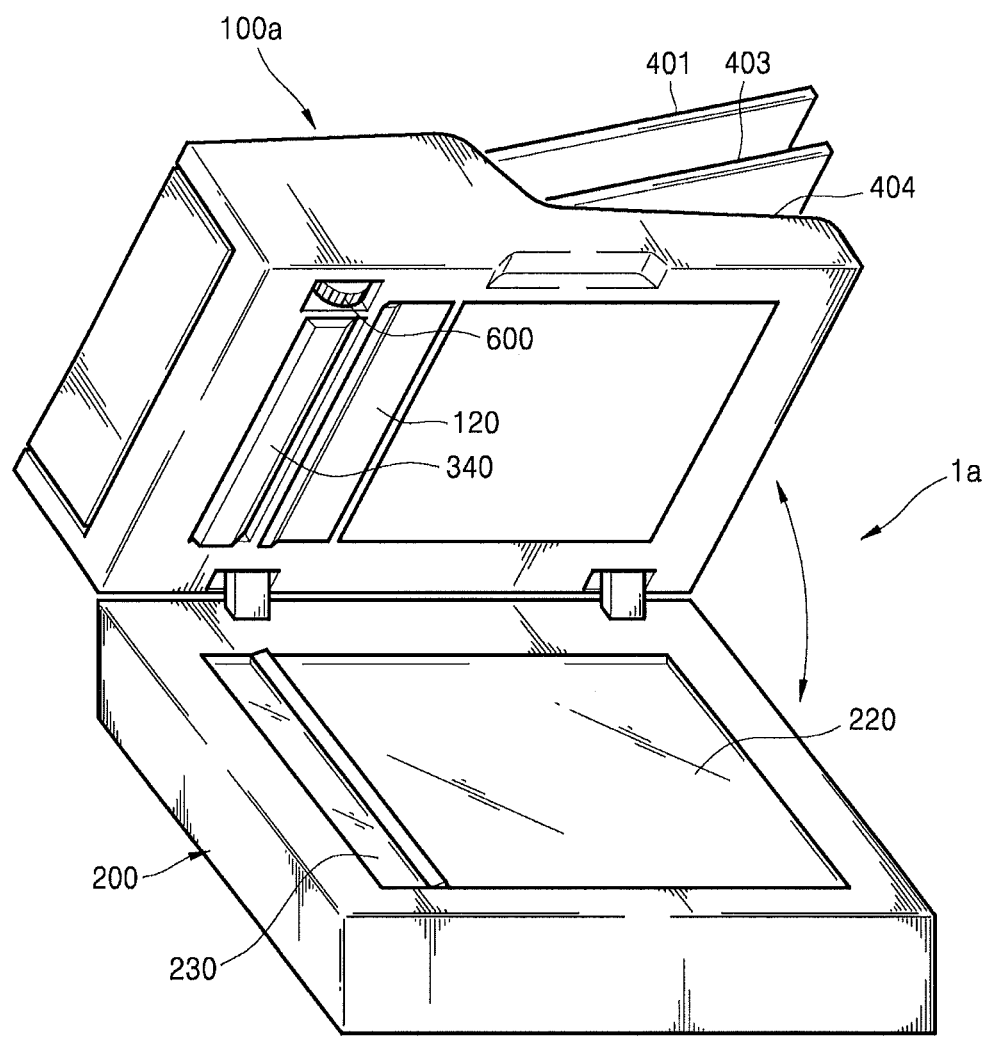
FIG. 6 is a schematic perspective view of a scanning device in a case where a document feeding unit is opened.

FIG. 5 is a schematic cross-sectional view of a scanning device 1a according to an embodiment, and FIG. 6 is an exemplary schematic perspective view of a scanning device 1a of FIG. 5 where a document feeding unit 100a is opened. According to the scanning device 1a of an exemplary embodiment, the document may be reversed to perform a duplex-scanning operation. Referring to FIGS. 5 and 6, a document feed path 300a includes a supply path 301a, a scanning path 302a, the discharge path 305, and a reverse path 304 to reverse the document.

A plurality of document feeding rollers to transfer documents may be disposed on the document feeding path 300a. For example, the pickup roller 311 to pick a document loaded in the supply tray 401 and the supply roller 315 transfer the picked document may be disposed on the supply path 301a. The supply roller 315 may include a pair of rollers that are rotated while engaging with each other to transfer the document. One of the pair of rollers is a driving roller and the other is a driven roller that is rotated in a state of being compressed by the driving roller. When the supply path 301a is opened to remove a jammed document, the driven roller may be separated from the driving roller or a compression force onto the driven roller may be removed. The ADF unit 314 to separate the picked documents, for example, one by one may be disposed between the pickup roller 311 and the supply roller 315.

A scanning guide member 340 facing the scanning member 210 may be disposed on the scanning path 302a. The scanning guide member 340 may be pressed against a transparent window 230 by a weight of itself or the elastic member 341, and the document is transferred between the transparent window 230 and the scanning guide member 340. Based on the scanning member 210, the feeding rollers 323 and 324 are disposed at opposite sides of the scanning member 210. Each of the feeding rollers 323 and 324 may include a driving roller and a driven roller that are rotated while engaging with each other.

The discharge path 305 includes first, second, and third discharge paths 305a, 350b, and 305c. The first and second discharge paths 305a and 305b are branched from the scanning path 302a. A first switch member 351 to selectively connect the scanning path 302a to the first or second discharge path 305a or 305b is disposed at a branch portion 361 between the scanning path 302a and the first and second discharge paths 305a and 305b. The first switch member 351 is switched between a location to connect the scanning path 302a to the first discharge path 305a (location denoted by a dotted line) and a location to connect the scanning path 302a to the second discharge path 305b (location denoted by a solid line). The third discharge path 305c is connected to the first and second discharge paths 305a and 305b. A second switch member 352 is disposed at a branch portion 362 between the first discharge path 305a and the third discharge path 305c. The second switch member 352 is switched between a location to connect the first discharge path 305a to the third discharge path 305c to guide the document going backward along the first discharge path 305a to the second discharge path 305b (location denoted by a solid line) and a location to block the third discharge path 305c (location denoted by a dotted line). Discharge rollers 332a and 332b are respectively disposed on the first and second discharge paths 305a and 305b. Each of the discharge rollers 332a and 332b may include a driving roller and a driven roller that are rotated while engaging with each other.

The reverse path 304 is branched from the scanning path 302a, and is connected to the supply path 301a. Also, the reverse path 304 is connected to the second discharge path 305b. A third switch member 353 is disposed at a branch portion 363 between the reverse path 304 and the scanning path 302a. The third switch member 353 is switched between a location to connect the scanning path 302a and the reverse path 304 (location denoted by a solid line) and a location to disconnect the scanning path 302a and the reverse path 304 (location denoted by a dotted line). A fourth switch member 354 is disposed at a branch portion 364 between the reverse path 304 and the second discharge path 305b. The fourth switch path 354 is switched between locations connect/disconnect the reverse path 304 and the second discharge path 305b. Reversing rollers 341 and 342 are respectively disposed on the reverse path 304. The reversing rollers 341 and 342 are respectively disposed at opposite sides of the branch portion 363. Each of the reversing rollers 341 and 342 includes a driving roller and a driven roller that are rotated while engaging with each other.

Exemplary scanning operations performed by the above configuration are described. A document loaded in the supply tray 401 may be withdrawn by the pickup roller 311 and the ADF unit 314 one by one, and may be supplied to the scanning path 302a via the supply path 301a. An image on the document may be scanned while the document passes through the scanning region where the scanning guide member 340 and the scanning member 210 face each other. The document from which the scanning operation is finished may be discharged to a first discharge tray 403 or a second discharge tray 404 via the first or second discharge path 305a or 305b. It may be determined which one of the trays 403 and 404 will receive the discharged document by adjusting the first, third, and fourth switch members 351, 353, and 354. After scanning a surface, the document discharged to the first or second discharge tray 403 or 404 is loaded in a face-down status, and thus, the document that is scanned first is loaded at a lowermost layer.

If a duplex-scanning operation is performed, the document may be transferred to the reverse path 304 after scanning the image on a front surface of the document. A fourth switch member 354 blocks the second discharge path 305b. If a rear end of the document passes through the branch portion 363, the third switch member 353 blocks the scanning path 302a. When the reverse roller 342 rotates in a reverse direction, the document is transferred along the reverse path 342 and is supplied to the scanning path 302a via the supply path 301. In this process, the document may be turned over so that a rear surface of the document faces the scanning member 210. After scanning the rear surface of the document, the document may be discharged to the first discharge path 305a. When a rear end of the document passes through the branch portion 362, the second switch member 352 may be switched to the location to connect the first discharge path 305a to the third discharge path 305c. When the discharge roller 332a is rotated in a reverse direction, the document may be transferred along the third discharge path 305c and is discharged to the first discharge tray 403 via the second discharge path 305b. The document may be turned over during passing through the third discharge path 305c, and thus, the document discharged to the first discharge tray 403 after the duplex-scanning operation may be loaded in a face-down status, and the document that is scanned first is located at a lowermost layer.

Although not illustrated in the drawings, sensors to sense the document may be provided in the supply path 301a, the scanning path 302a, the discharge path 305, and the reverse path 304.

According to the scanning device 1a of the embodiment, a user may manually rotate the document feeding rollers. As an example, referring to FIG. 6, a knob 600 exposed from a bottom surface of a document feeding unit 100a is illustrated. The knob 600 is selectively connected to the rollers by a clutch unit.

The scanning device 1a of an exemplary embodiment includes covers 110a and 120 to open/close a part of a document feeding path 300a. For example, the cover 110a opens/closes the supply path 301a. The cover 110a may be rotated to open the supply path 301a as illustrated by broken lines 5000 in FIG. 5. Therefore, when double-feed documents or jammed document exists in the supply path 301a, the cover 110a may be rotated to open the supply path 301a and the jammed document may be removed. The cover 120 opens/closes a part of the scanning path 302a. The cover 120 of the present embodiment opens a downstream path of the scanning region. The clutch unit may selectively connect the knob 600 to the rollers in correspondence with the opening/closing operations of the cover 120. When the cover 120 is located at a closed position where the scanning path 302a is formed, the knob 600 may be disconnected from the feeding roller 323, and when the cover 120 is located at an opening position where the scanning path 302a is opened, the knob 600 may be connected to the feeding roller 323.

Figure 7:
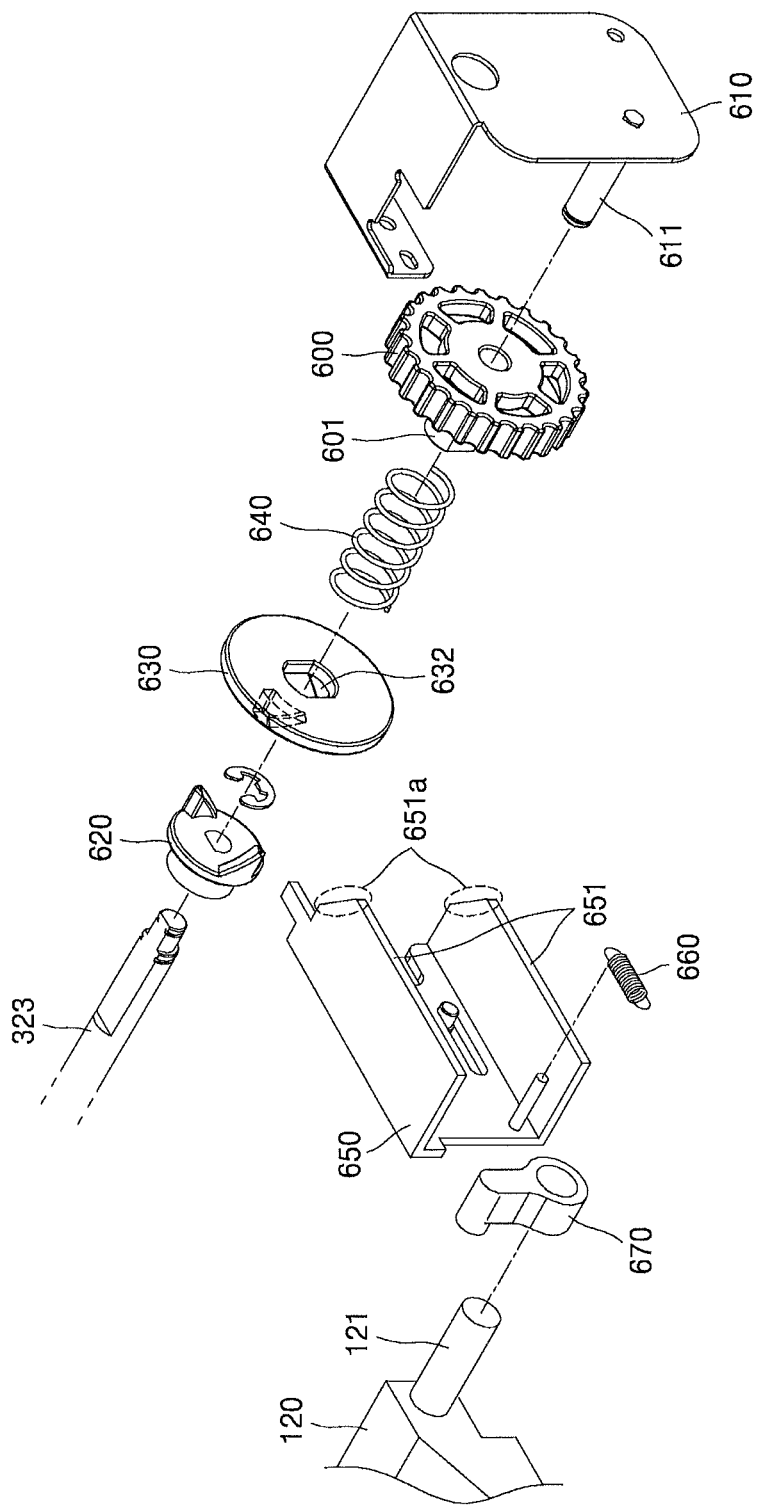
FIG. 7 is an exploded perspective view of a clutch unit according to an embodiment.

FIG. 7 is an exploded perspective view of a clutch unit according to an embodiment. Referring to FIG. 7, a first clutch member 620 and a second clutch member 630 are provided. The first clutch member 620 may be inserted in a rotary shaft of the feeding roller 323. The second clutch member 630 may be connected to the knob 600 to be rotated with the knob 600, and may be configured to approach to/separate from the first clutch member 620. For example, a support axis 611 that is coaxial with the rotary shaft of the feeding roller 321 may be provided on a bracket 610, and the knob 600 is rotatably inserted in the support axis 611. The knob 600 includes an extension axis 601 that is coaxial with the support axis 611 and extending toward the feeding roller 323, and the second clutch member 630 is provided on the extension axis 601 to be slid in the extension axis 601 direction. The second clutch member 630 includes an insertion hole 632 that forms a pair with the extension axis 601. The extension axis 601 and the insertion hole 632 may be formed so that the knob 600 and the second clutch member 630 may be rotated together. That is, when rotating the knob 600, the second clutch member 630 is also rotated.

The first and second clutch members 620 and 630 respectively include first and second connection portions 621 and 631 that may be complementary members engaged with each other to transmit the rotating force. The first elastic member 640 may be disposed between the second clutch member 630 and the knob 600, and applies the elastic force to the second clutch member 630 so that the second clutch member 630 may be slid in a direction toward the location where the first and second connection portions 621 and 631 are engaged. The first elastic member 640 may be, for example, a compression coil spring having an end portion and the other end portion respectively supported by the first and second clutch members 620 and 630.

The sliding member 650 may be slid in response to the opening/closing operations of the cover 120. The sliding member 650 may be provided on a frame of the document feeding unit 100a to be slid, although not illustrated in the drawings. The sliding member 650 moves the second clutch member 630 to a connection location where the first and second connection portions 621 and 631 are engaged with each other and a separation location where the first and second connection portions 621 and 631 are separated from each other, in correspondence with the opening/closing operations of the cover 120. The sliding member 650 includes a push lever 651 pushing the second clutch member 630 to the separation location. The push lever 651 includes a contact portion 651a that contacts the second clutch member 630 in order to move the second clutch member 630 to the separation location. The contact portion 651a may include an inclined surface that is inclined with respect to the sliding direction of the sliding member 650. The inclined surface may be a plane or a curved surface.

The second elastic member 660 applies the elastic fore to the sliding member 650 so that the sliding member 650 may slide in a direction of moving the second clutch member 630 to the connection position. The second elastic member 660 may be, for example, a tension coil spring having an end portion and the other portion respectively supported by the cover 120 and the sliding member 650.

A release member 670 may be coupled to the rotary shaft 121 of the cover 120, and is rotated with the cover 120 when the cover 120 rotates based on the rotary shaft 121 in order to open/close the scanning path 302a. The release member 670 pushes the sliding member 650 in an opposite direction in which the elastic force of the second elastic member 660 may be applied, when the cover 120 rotates to the location where the scanning path 302a may be closed. Accordingly, the second clutch member 630 may be pushed by the push lever 651 and is slid so that the first and second connection portions 621 and 631 are separated from each other.

Figure 8A:
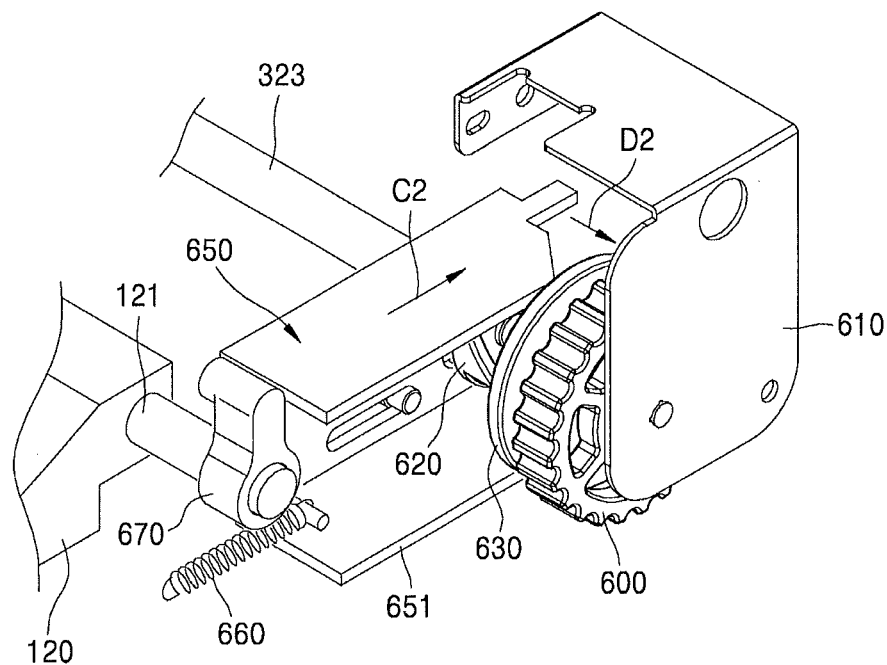
FIG. 8A is a perspective view of a clutch unit when a cover is closed.
Figure 8B:
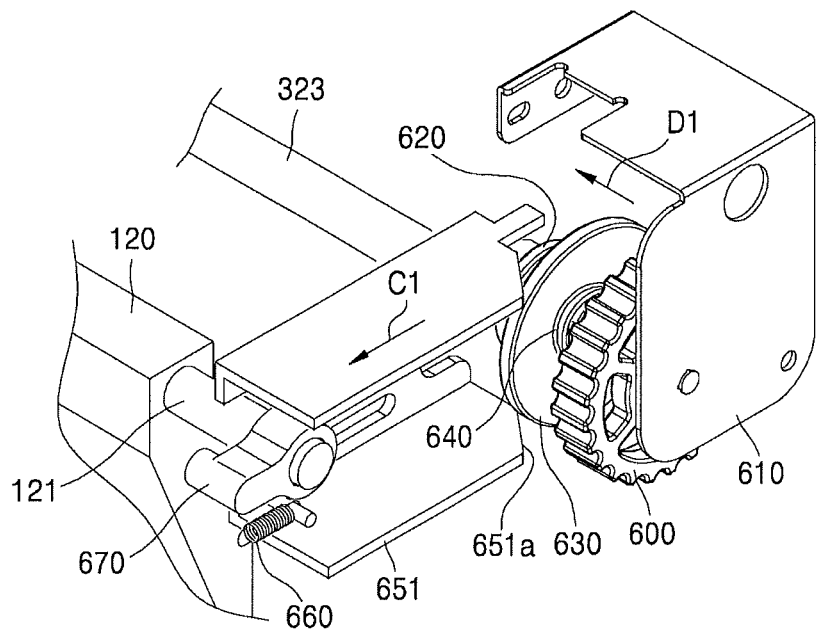
FIG. 8B is a perspective view of a clutch unit when a cover is opened.

FIG. 8A is an exemplary perspective view of a clutch unit in a state where the cover 120 is closed, and FIG. 8B is an exemplary perspective view of a clutch unit when the cover 120 is opened. Referring to FIG. 8A, the sliding member 650 contacts the release member 670 by the elastic force of the second elastic member 660 in a state where the cover 120 is closed. The push lever 651 may be disposed between the first and second clutch members 620 and 630 so that the first and second connection portions 621 and 631 are separated from each other. In this state, even when the feeding roller 323 is rotated by a driving motor (not illustrated), the second clutch member 630 and the knob 600 are not rotated.

When the document feeding unit 100a is opened as illustrated in FIG. 6 and the cover 120 is rotated as denoted by the broken lines 5000 in FIG. 5 in order to open a part of the document feeding path 300a, for example, the scanning path 302a, the release member 670 may be rotated to be apart from the sliding member 650, and the sliding member 650 may be slid toward the cover 120, that is, an arrow C1 direction of FIG. 8B, by the elastic force of the second elastic member 660. The push lever 651 may be separated from the second clutch member 630, and the second clutch member 630 may be slid toward the first clutch member 620, that is, an arrow D1 direction of FIG. 8B, by the elastic force of the first elastic member 640, and the first and second connection portions 621 and 631 are engaged with each other. In this state, when the knob 600 exposed on the bottom surface of the document feeding unit 100 is rotated, the feeding roller 323 and the other rollers connected thereto, for example, the feeding roller 324, the discharge rollers 332a and 332b, and the reverse rollers 341 and 342, are rotated together, and the document in the scanning path 302a, the discharge path 305, or the reverse path 304 may be discharged to the first or second discharge tray 403 or 404.

After discharging the document, the cover 120 may be closed, and, the release member 670 pushes the sliding member 650 in a direction opposite to the direction in which the elastic force of the second elastic member 660 is applied, that is, an arrow C2 direction of FIG. 8A. Since the sliding member 650 is slid by the release member 670, the push lever 651 pushes the second clutch member 630 in a direction opposite to the direction in which the elastic force of the first elastic member 640 is applied, that is, an arrow D2 direction of FIG. 8A, to separate the first and second connection portions 621 and 631 from each other. When the cover 120 is completely closed, as illustrated in FIG. 8A, the knob 600 and the feeding roller 323 are disconnected from each other.

The first and second connection portions 621 and 631 may be configured to be engaged with each other, for example, in only one direction, and the configurations may be the same as the first and second connection portions 521 and 531 illustrated in FIG. 3.

According to the scanning device 1 or 1a including the clutch unit, the knob 500 or 600 may be connected to the feeding rollers only when the jammed document has to be removed, and may be disconnected from the feeding rollers during the operation of the scanning device 1 or 1a. Accordingly, while the scanning device 1 or 1a operates, the knob 500 or 600 may not be rotated. Thus, operating noise may be reduced, and abrasion of the components may be reduced to improve the reliability of the scanning device.

Figure 9:
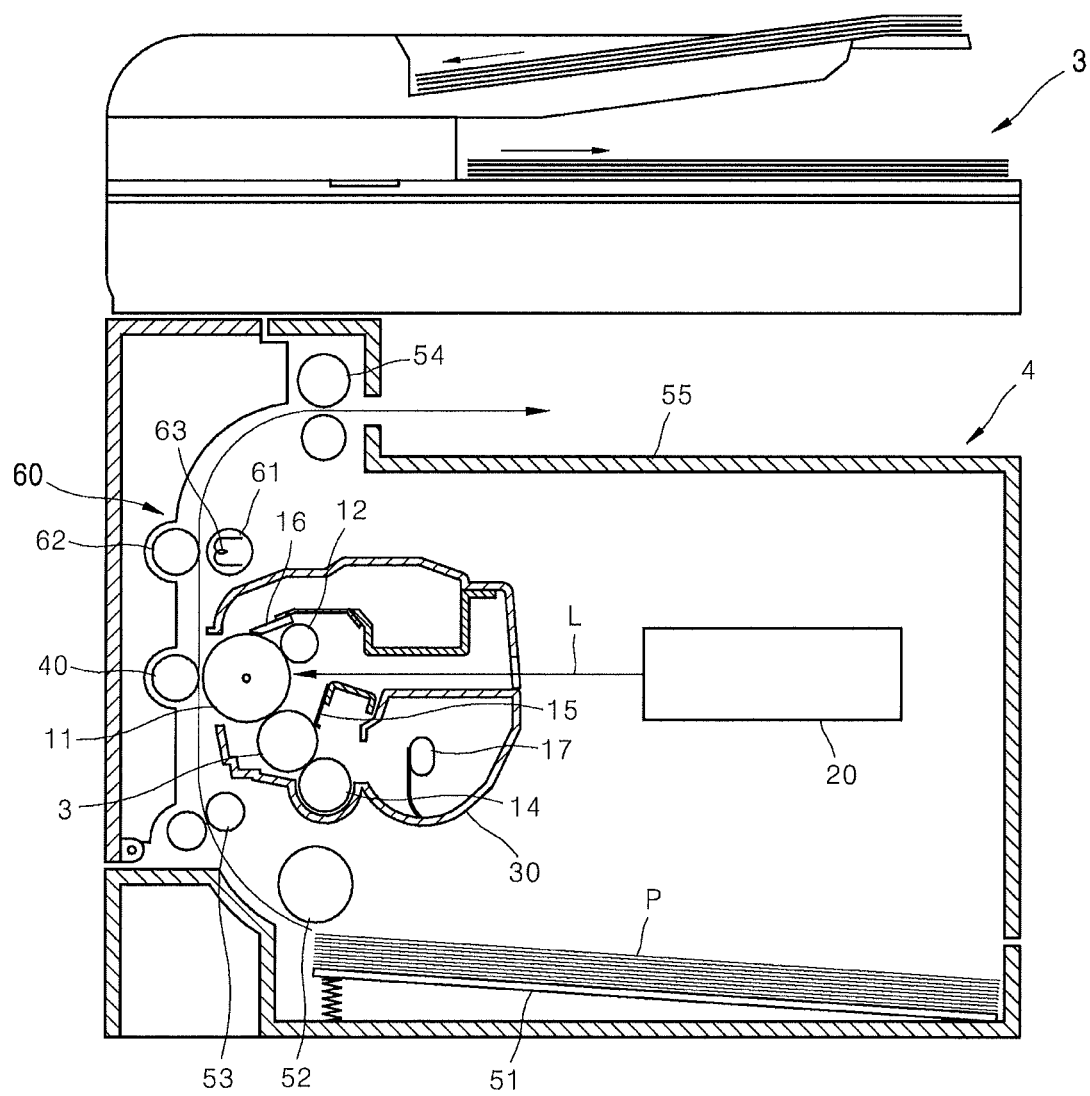
FIG. 9 is a schematic block diagram of an image forming apparatus according to an embodiment.

FIG. 9 is a schematic block diagram of an image forming apparatus according to an embodiment. Referring to FIG. 9, a scanning device 3 and a printing unit 4 are provided. The printing unit 4 of the present embodiment is an electrophotographic printing unit that prints images on printing media in an electrophotographic method. The scanning device 3 may be located above the printing unit 4. The scanning device 3 may be the scanning device 1 illustrated in FIG. 1 or the scanning device 1a illustrated in FIG. 5.

The printing unit 4 includes a photosensitive drum 11, a charging roller 12, an exposure unit 20, a developing unit 30, and a transfer roller 40. The photosensitive drum 11 is an example of a photosensitive body on which an electrostatic latent image is formed, and includes a photosensitive layer having a photoconductivity formed on an outer circumference of a cylindrical metal pipe. The charging roller 12 is an example of a charger to charge a surface of the photosensitive drum 11 to a uniform potential. A corona charger (not illustrated) may be used instead of the charging roller 12.

The exposure unit 20 irradiates light (L) that is modulated according to image information to the surface of the photosensitive drum 11, which is charged to a uniform potential, to form an electrostatic latent image. A laser scanning unit (LSU) that deflects light emitted from a laser diode in a main scanning direction by using a polygon mirror and scans the deflected light onto the photosensitive drum 11 may be used as the exposure unit 20.

The developing unit 30 supplies a toner to the electrostatic latent image formed on the photosensitive drum 11 to develop the electrostatic latent image. The developing unit 30 accommodates a toner. A developing roller 13 supplies the toner to the electrostatic latent image formed on the photosensitive drum 11 to develop the electrostatic image as a visible toner image. An embodiment adopts a non-contact developing method, that is, a surface of the developing roller 13 may be separated hundreds of µm from the surface of the photosensitive drum 11. The above separation may be referred to as a developing gap. When a developing bias voltage is applied to the developing roller 13, the toner is transferred and attached to the electrostatic latent image formed on the photosensitive drum 11 via the developing gap. If a contact type developing method is used, the developing roller 13 contacts the photosensitive drum 11. The developing unit 30 may include a supplying roller 14 to attach the toner to the developing roller 13. A supply bias voltage may be applied to the supplying roller 14 in order to attach the toner to the developing roller 13. A regulating member 15 regulates an amount of the toner attached to the surface of the developing roller 13. The regulating member 15 may be a regulating blade having a front edge that contacts the developing roller 13 with a predetermined pressure. A cleaning member 16 removes remaining toner and impurities from the surface of the photosensitive drum 11 before charging the photosensitive drum 11. The cleaning member 16 may be, for example, a cleaning blade having a front edge contacting the surface of the photosensitive drum 11. An agitator 17 conveys the toner to the developing roller 13. The agitator 17 agitates the toner to charge the toner to a predetermined potential.

The transfer roller 40 is an example of a transfer unit that faces the surface of the photosensitive drum 11 to form a transfer nip. A transfer bias voltage may be applied to the transfer roller 40 in order to transfer the toner image formed on the surface of the photosensitive drum 11 onto a recording medium P. A corona transfer unit may be used instead of the transfer roller 40.

The printing medium P on which an image is to be printed may be withdrawn from a paper cassette 51 by a pickup roller 52. The recording medium P may be supplied to a region where the transfer roller 40 and the photosensitive drum 11 face each other by a feeding roller 53. The toner image on the photosensitive drum 11 may be transferred onto the surface of the recording medium P by the transfer bias voltage applied to the transfer roller 40, and may be maintained on the surface of the recording medium P due to an electrostatic attraction.

A fusing unit 60 applies heat and pressure to the toner image so that the toner image may be fused in the recording medium P, and thus, a permanent printing image is formed on the recording medium P. The fusing unit 60 may be configured so that a heating roller 61 including a heating unit 63 therein and a compression roller 62 are engaged to each other to form a fusing nip. The recording medium P passed through the fusing unit 60 is discharged to a discharge tray 55 by a discharge roller 54.

According to the image forming apparatus described above, a printing operation, a copying operation, and a scanning operation may be performed. The printing operation is an operation of printing images on a medium based on image information transmitted from an external host (not illustrated). The copying operation is an operation of reading image information from a document by using the scanning device 3 and transferring the read image information to the printing unit 4 to print the image on a medium. The scanning operation is an operation of reading image information from a document, for example, the read image information may be transmitted to a host (not illustrated). If there is a communication unit (not illustrated), a fax transmission function to transmit the read image information via a communication line such as a telephone line and a fax reception function to print image information received via the telephone line by using the printing unit 4 may be performed.

In the above described embodiments, a monochromatic electrophotographic printing unit 4 including one developing unit 30 is described; however, the embodiments are not limited thereto. In a case of a full-color electrophotographic printing unit, four developing units 30 respectively accommodating cyan, magenta, yellow, and black toners, for example, may be adopted. A printing unit 4 may adopt another kind of image forming method, for example, an inkjet method or a thermal transfer method.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A scanning device comprising:
   document feeding rollers configured to convey a document along a document feeding path of the scanning device;
   a scanning member on the document feeding path configured to read images from the conveyed document;
   a cover configured to open and to close at least a part of the document feeding path;
   a knob configured to manually rotate at least some of the document feeding rollers; and
   a clutch unit configured to selectively connect at least one of the document feeding rollers to the knob in correspondence with opening and closing operations of the cover,
   wherein the clutch unit disconnects the document feeding rollers and the knob from each other when the cover is located at a closed position, and connects at least one of the document feeding rollers to the knob when the cover is located at an open position, and
   wherein the clutch unit comprises:
      a first clutch member provided on one of the document feeding rollers, and comprising a first connection portion, a second clutch member rotating with the knob, and comprising a second connection portion that is formed complementary with the first connection portion, and a sliding member to slide the second clutch member between a connection position where the first and second connection portions are connected to each other and a separation position where the first and second connection portions are separated from each other, by the opening and closing operations of the cover.

2. The scanning device of claim 1, wherein the document feeding path comprises a scanning path in which the scanning member is provided, a supply path to supply a document to the scanning path, and a discharge path to discharge the document that has passed through the scanning path, and the cover opens and closes the supply path.

3. The scanning device of claim 1, wherein the document feeding path comprises a scanning path in which the scanning member is provided, a supply path to supply a document to the scanning path, and a discharge path to discharge the document passed through the scanning path, and the cover opens and closes a part of the scanning path.

4. The scanning device of claim 1, wherein an extension axis that is coaxial with a rotary shaft of the document feeding roller having the first clutch member is provided on the knob, and the second clutch member is provided on the extension axis to be slid.

5. The scanning device of claim 1, wherein the clutch unit further comprises a first elastic member to apply an elastic force to the second clutch member in a direction toward the connection position, and the sliding member pushes the second clutch member in a direction opposite to the elastic force of the first elastic member to move the second clutch member to the separation position when the cover is moved from the opened position to the closed position.

6. The scanning device of claim 5, wherein the clutch unit further comprises a second elastic member applying an elastic force to the sliding member so that the sliding member slides in a direction of moving the second clutch member to the connection position.

7. The scanning device of claim 1, wherein the document feeding path comprises a scanning path in which the scanning member is provided, the scanning device further comprises a feeding roller provided in the scanning path to convey the document, and the clutch unit selectively connects the knob to the feeding roller.

8. The scanning device of claim 7, wherein the document feeding path comprises a discharge path to discharge the document passed through the scanning path, the scanning device further comprises a discharge roller disposed on the discharge path to discharge the document, and the discharge roller is connected to the feeding roller and is rotated with the feeding roller when the knob is rotated.

9. An image forming apparatus comprising:
a scanning device comprising:
document feeding rollers configured to convey a document along a document feeding path of the scanning device,
a scanning member on the document feeding path configured to read images from the conveyed document,
a cover configured to open and to close at least a part of the document feeding path,
a knob configured to manually rotate at least some of the document feeding rollers, and a clutch unit configured to selectively connect at least one of the document feeding rollers to the knob in correspondence with opening and closing operations of the cover; and a printing unit configured to form an image on a recording medium, wherein the clutch unit disconnects the document feeding rollers and the knob from each other when the cover is located at the closed position, and connects at least one of the document feeding rollers to the knob when the cover is located at the opening position, and wherein the clutch unit comprises:
a first clutch member provided on one of the document feeding rollers, and comprising a first connection portion,
a second clutch member rotating with the knob, and comprising a second connection portion that is formed complementary with the first connection portion, and
a sliding member to slide the second clutch member between a connection position where the first and second connection portions are connected to each other and a separation position where the first and second connection portions are separated from each other, by the opening and closing operations of the cover.

10. The image forming apparatus of claim 9, wherein the document feeding path comprises a scanning path in which the scanning member is provided, a supply path to supply the document to the scanning path, and a discharge path discharge the document passed through the scanning path, and the cover opens and closes the supply path.

11. The image forming apparatus of claim 9, wherein the document feeding path comprises a scanning path in which the scanning member is provided, a supply path to supply a document to the scanning path, and a discharge path to discharge the document passed through the scanning path, and the cover opens and closes a part of the scanning path.

12. The image forming apparatus of claim 9, wherein an extension axis that is coaxial with a rotary shaft of the document feeding roller having the first clutch member is provided on the knob, and the second clutch member is provided on the extension axis to be slid.

13. The image forming apparatus of claim 9, wherein the clutch unit further comprises a first elastic member to apply an elastic force to the second clutch member in a direction toward the connection position, and the sliding member pushes the second clutch member in a direction opposite to the elastic force of the first elastic member to move the second clutch member to the separation position when the cover is moved from the opened position to the closed position.

14. The image forming apparatus of claim 13, wherein the clutch unit further comprises a second elastic member applying an elastic force to the sliding member so that the sliding member slide in a direction of moving the second clutch member to the connection position.

15. The image forming apparatus of claim 9, wherein the document feeding path comprises a scanning path in which the scanning member is provided, the scanning device further comprises a feeding roller provided in the scanning path to convey the document, and the clutch unit selectively connects the knob to the feeding roller.

16. The image forming apparatus of claim 15, wherein the document feeding path comprises a discharge path to discharge the document passed through the scanning path, the scanning device further comprises a discharge roller disposed on the discharge path to discharge the document, and the discharge roller is connected to the feeding roller and is rotated with the feeding roller when the knob is rotated.

17. An apparatus comprising:
- document feeding rollers configured to convey a document along a document feeding path of the apparatus;
- a cover configured to open and to close at least a part of the document feeding path;
- a mechanism configured to rotate at least some of the document feeding rollers; and
- a clutch unit configured to selectively connect at least one of the document feeding rollers to the mechanism in correspondence with opening and closing operations of the cover,
- wherein the clutch unit comprises:
  - a first clutch member provided on one of the document feeding rollers, and comprising a first connection portion,
  - a second clutch member rotating with the mechanism, and comprising a second connection portion that is formed complementary with the first connection portion, and
  - a sliding member to slide the second clutch member between a connection position where the first and second connection portions are connected to each other and a separation position where the first and second connection portions are separated from each other, by the opening and closing operations of the cover.

* * * * *